US 7,230,799 B2

(12) United States Patent
Lille (10) Patent No.: US 7,230,799 B2
(45) Date of Patent: Jun. 12, 2007

(54) ELECTRO-THERMAL MICROMECHANICAL ACTUATOR FOR FINITELY POSITIONING A STORAGE DEVICE SLIDER AND METHODS OF USE AND MANUFACTURE

(75) Inventor: Jeffrey S. Lille, Sunnyvale, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 163 days.

(21) Appl. No.: 09/933,218

(22) Filed: Aug. 20, 2001

(65) Prior Publication Data
US 2003/0035237 A1 Feb. 20, 2003

(51) Int. Cl.
*G11B 5/56* (2006.01)
(52) U.S. Cl. .................................... 360/294.3
(58) Field of Classification Search ............. 360/294.3, 360/294.1, 59, 75, 77.02, 265.9; 216/41
See application file for complete search history.

(56) References Cited

U.S. PATENT DOCUMENTS

| | | | | |
|---|---|---|---|---|
| 4,814,908 | A * | 3/1989 | Schmitz .................... 360/77.02 |
| 5,184,265 | A * | 2/1993 | Foote et al. ............. 360/265.9 |
| 5,440,437 | A * | 8/1995 | Sanada et al. ........... 360/265.9 |
| 5,745,319 | A | 4/1998 | Takekado et al. ........ 360/78.05 |
| 5,764,432 | A | 6/1998 | Kasahara ..................... 360/75 |
| 5,856,967 | A | 1/1999 | Mamin et al. .............. 369/126 |
| 5,959,801 | A | 9/1999 | Gillis et al. .................... 360/75 |
| 5,991,113 | A * | 11/1999 | Meyer et al. ................. 360/75 |
| 6,391,216 | B1 * | 5/2002 | Nakatani ..................... 216/41 |
| 2004/0027709 | A1 * | 2/2004 | Hamaguchi et al. .......... 360/59 |

FOREIGN PATENT DOCUMENTS

| | | |
|---|---|---|
| EP | 242 597 | 10/1987 |
| JP | 59-203272 | 11/1984 |

(Continued)

OTHER PUBLICATIONS

K. H. Stokes and R. B. Watrous, "Magentic Head with Piezoelectric Positioning", vol. 16, No. 5, Oct. 1973, p. 1429.

(Continued)

*Primary Examiner*—Tianjie Chen
(74) *Attorney, Agent, or Firm*—Kunzler & McKenzie (57) ABSTRACT

A system and method for controlling the position of a digital data storage device slider through the use of an electro-thermal micromechanical actuator is disclosed. A movable member is etched into a face of a slider opposite the air-bearing surface of the slider. The movable member is substantially freestanding in relation to the slider, having only a single end connected to the slider. An electrically actuated heater element with two parallel current paths is disposed on the movable member. One of the current paths is substantially narrower than the other current path. When a current is passed through the heater element, the narrower current path heats up more quickly than the wider current path. By varying the current passed through the heater element in a selected manner, a distortion of the movable member is harnessed and used to create a relative motion in the slider body, allowing the slider to be quickly and exactly located over the centerline of a track of a storage device.

8 Claims, 10 Drawing Sheets

FOREIGN PATENT DOCUMENTS

| | | | |
|---|---|---|---|
| JP | 62-3476 | | 1/1987 |
| JP | 03069073 A | * | 3/1991 |
| JP | 4-157685 | | 5/1992 |
| JP | 04221474 A | * | 8/1992 |
| JP | 07312045 A | * | 11/1995 |
| JP | 08287534 A | | 11/1996 |

OTHER PUBLICATIONS

G. Elsner, H. Hinkel and E. Prinz, "Magnetic Head with Retractable R/W Element", vol. 27, No. 7B, Dec. 1984, pp. 4573-4574.

Bruce D.S. Chou, Change-Nan Chen and Jin-Shown Shie, "Micromachining on (111)-Oriented Silicon", Sensors and Actuators 75 (1999) 271-277.

John H. Comtois, M. Adrian Michalicek and Carol Craig Barron, "Electrothermal Actuators Fabricated in Four-level Planarized Surface Micromachined Polycrystalline Silicon", Sensors and Actutors A 70 (1998) 23-31.

K. H. Stokes and R. B. Watrous, "Magnetic Head with Piezoelectric Positioning", vol. 16 No. 5, Oct. 1973, p. 1429.

G. Elsner, H. Hinkel and E. Prinz, "Magnetic Head with Retractable R/W Element", vol. 27 No. 7B, Dec. 1984, pp. 4573-4574.

* cited by examiner

*Prior Art*

ELECTRO-THERMAL MICROMECHANICAL ACTUATOR FOR FINITELY POSITIONING A STORAGE DEVICE SLIDER AND METHODS OF USE AND MANUFACTURE

BACKGROUND OF THE INVENTION

1. The Field of the Invention

The invention relates to digital storage devices having a rotating media and more specifically to systems and methods for finitely positioning a read/write slider in such a storage device.

2. The Relevant Art

Computer systems generally utilize auxiliary storage devices onto which data can be written and from which data can be read for later use. A direct access storage device (DASD) is a common auxiliary storage device in which data is stored in known locations and accessed by reference to those locations. A hard disk drive is a type of DASD that incorporates rotating magnetic disks for storing data in magnetic form on concentric, radially spaced tracks on the disk surfaces. Transducer heads driven in a path generally perpendicular to the drive axis are used to write data to and read data from addressed locations on the disks. These transducer heads are often referred to as sliders.

Current hard disk drives also typically utilize an actuator connected to the slider by a support arm assembly. The actuator moves the slider to the desired track and maintains it over the track centerline during read or write operations. The movement of the slider to a desired track is referred to as data seeking or merely "seeking," Maintaining the slider over the centerline of the desired track during read or write operation is referred to as track following or "tracking."

Current hard disk drives also typically utilize an actuator connected to the slider by a support arm assembly. The actuator moves the slider to the desired track and maintains it over the track centerline during read or write operations. The movement of the slider to a desired track is referred to as data seeking or merely "seeking." Maintaining the slider over the centerline of the desired track during read or write operation is referred to as track following or "tracking."

The voice coil motor (VCM) typically comprises a coil movable throughout the magnetic field of a permanent magnetic stator. The application of current to the VCM causes the coil, and thus the attached head, to move in a radial fashion. In the absence of bias forces, the acceleration of the coil is proportional to the applied current. A power amplifier in response to a control input supplies this current.

In modem hard disk drive systems, the density of data tracks on the magnetic disks is increasing at a dramatic rate. Prior art control systems of the described type are experiencing difficulty in adequately positioning the slider exactly over the centerline of the track for read and write operation in such high density hard disk drives. As the track pitch of hard disk drives becomes smaller, prior art VCM systems are becoming inadequate at positioning the slider with sufficient speed and accuracy to ensure that the read/write transducer remains positioned over the centerline of the desired track during read and write processes.

Accordingly, it should be apparent that a need exists for an improved positioning device capable of finely positioning the slider of a hard disk drive such that a read/write transducer can be quickly and accurately positioned over the centerline of a DASD track in response to control signals from the DASD and positioning signals from the disk surface of the hard disk drive.

OBJECTS AND BRIEF SUMMARY OF THE INVENTION

The DASD positioning system of the present invention has been developed in response to the present state of the art, and in particular, in response to the problems and needs in the art that have not yet been fully solved by currently available DASD positioning systems. Accordingly, it is an overall object of the present invention to provide a DASD positioning system that overcomes many or all of the above-discussed shortcomings in the art.

To achieve the foregoing object, and in accordance with the invention as embodied and broadly described herein in the preferred embodiments, an improved read/write slider of a DASD is provided together with methods of use and manufacture of the read/write slider.

The improved electro-thermal micromechanical actuator of the present invention in one embodiment comprises a read/write slider coupled to a movable member on the read/write head, and an electro-thermal actuator element located on the movable member. In one embodiment, the movable member is configured such that current passed through the electro-thermal actuator element causes distortion of the movable member and relative positioning of the read/write slider.

The movable member may consist of a freestanding structure attached at one end to the read/write slider and may comprise a U-shaped region etched out of a face of a body of the read/write slider perpendicular to the air-bearing surface of the read/write slider. First and second leads may be formed on the movable member extending in two substantially parallel directions. Preferably, the first lead extends along a first side of the movable member and the second lead extends along a second side of the movable member, with the first lead being substantially narrower than the second lead. Accordingly, the electro-thermal heater element distorts the movable member, allowing it to be displaced to one side or returned to a detente position depending upon the amount of current that is passed through the electro-thermal heater element.

The improved method of manufacturing an improved electro-thermal micromechanical actuator of the current invention in one embodiment comprises lithographically defining a movable member on the surface of the slider opposite the air bearing surface of the slider. The lithographically defined member is then deep reactive ion etched in the surface of the slider. In order to enable the movable member to be reactive ion etched into the slider body, the slider body is preferably formed of an etchable material such as silicon. Once the movable member has been defined and etched on the slider, an electro-thermal actuator is formed on the movable member.

The heater element preferably comprises material with a high melting point. Preferably, the melting point is greater than about 500 degrees C. For instance, the material may comprise Titanium, Tungsten, or Tantalum. Preferably, the material is sputtered on the movable member in a patterned manner to form a heater element. In one embodiment, the heater element is formed upon the slider body with two substantially parallel and coextensive leads that are connected to electrical contact pads that allow current to be applied to the heater element. The two leads are preferably configured such that one lead is substantially narrower than the other. This configuration causes the narrow lead to heat more quickly than the wide lead when a current is applied to the heater element.

As the narrow lead of the heater element heats up, it disproportionately heats one side of the movable member, causing the movable member to distort and thereby displace in a predictable fashion. The displacement of the movable member causes a relative deflection in the position of the slider. The distance that the slider is deflected is governed by the amount of current that is passed through the heater element. Thus, an exact amount of current can be applied to the electro-thermal actuator to quickly and exactly position the read/write transducer exactly over the centerline of the track. In one embodiment of a manner of use of a storage device incorporating the positioning system of the present invention, gross positioning is conducted in a standard manner. Once the gross positioning is conducted, finite positioning using the positioning system of the present invention is initiated and used to finalize the position of the slider and preferably, for continued tracking on the selected track, until the slider is repositioned to a different track. The finite positioning of the present invention may be initiated in response to a position error signal (PES) such as, for instance, when the PES experiences a high degree of non-repeatable runout. These and other objects, features, and advantages of the present invention will become more fully apparent from the following description and appended claims, or may be learned by the practice of the invention as set forth hereinafter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
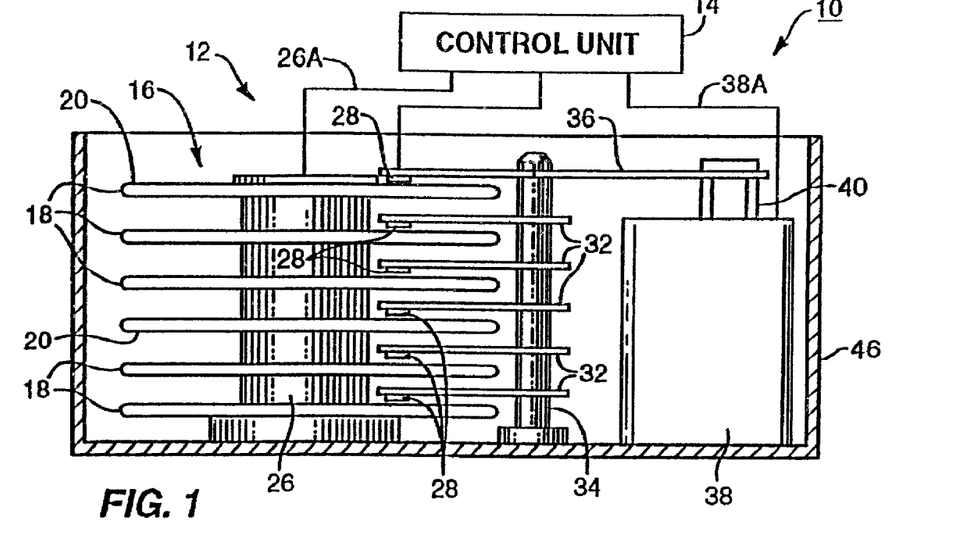
FIG. 1 is a partially schematic view showing components of a direct access storage device (DASD) suitable for incorporating the positioning system of the present invention.

FIG. 1 shows a partial schematic block diagram illustrating the basic components of digital storage device. Shown in the depicted embodiment is a direct access storage device (DASD) in the form of a magnetic hard disk drive unit 10. Of course, the present invention may also be employed within any other suitable type of digital storage device. The disk drive unit 10 is shown including a data storage medium generally designated at 12 and a control unit generally designated at 14. The disk drive unit 10 is shown illustrated in a simplified form sufficient for an understanding of the present invention, and as one example of the various types of storage devices that might employ the system and methods of the present invention.

The illustrated disk drive unit 10 includes a stack 16 of disks 18 each having at least one magnetic storage surface 20. The disks 18 are mounted in parallel for simultaneous rotation on and by an integrated spindle and motor assembly 26. Data stored on the surface 20 of each disk 18 is read from and/or written to by a corresponding transducer head 28 movable across the disk surface 20.

The transducer heads 28 are mounted on flexure springs 30 carried by arms 32 collectively mounted for simultaneous pivotal movement about a support spindle 34. One of the arms 32 includes an extension 36 driven in a pivotal motion by a head drive motor 38. Although several drive arrangements are commonly used, the motor 38 in one embodiment comprises a voice coil motor 40 cooperating with a magnet and core assembly (not shown). The motor 40 is operatively controlled by the control unit 14 to move the transducer heads 28 in synchronism in a radial direction in order to position the transducer heads 28 in registration with data tracks 42 (of FIG. 2) to be followed and to access separately addresses data sectors 44 of the data tracks 42.

The disk drive unit 10 is shown as a modular unit enclosed within a housing 46. The various components of the disk drive unit 10 are controlled by signals generated by the control unit 14. These signals preferably include motor control signals on a line 26A and position control signals on a line 38A.

Figure 2:
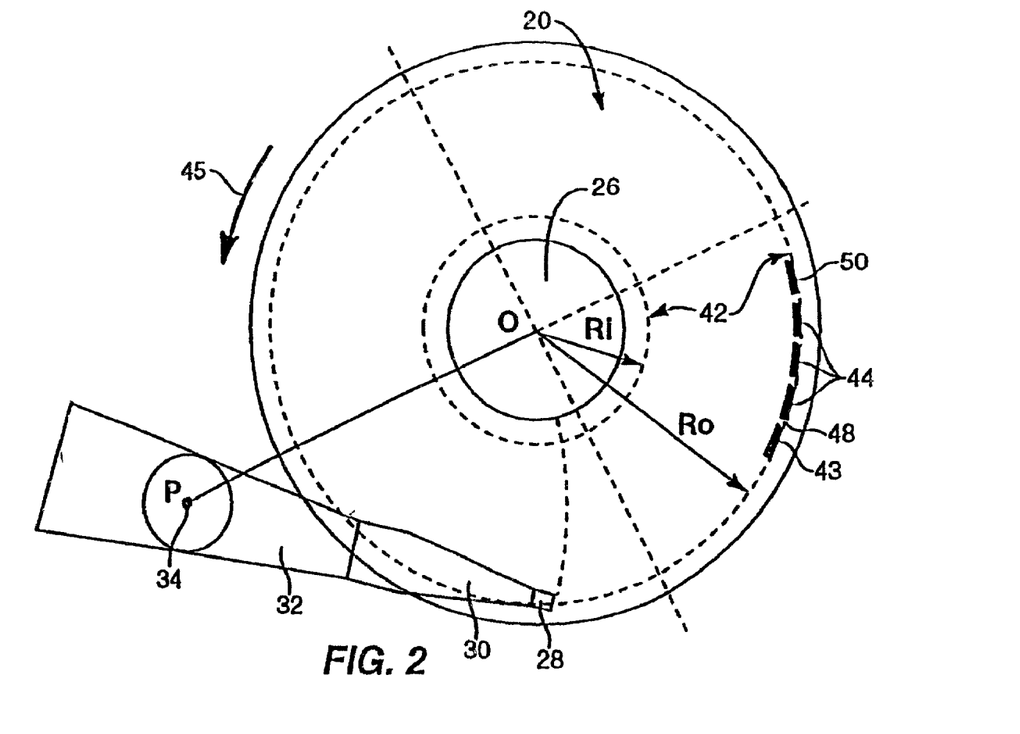
FIG. 2 is a top view of the DASD of FIG. 1.

Referring to FIG. 2, a number of data tracks 42 are arrayed, each at a specific radial location, in a concentric pattern in the magnetic medium of each disk surface 20. A data cylinder includes a set of corresponding data tracks 42 for each data surface 20 in the data storage disk unit 10. The data tracks 42 include a plurality of addressed segments or data sectors 44, each containing a predefined amount of data storage locations for storing data records for later retrieval.

The sectors 44 are disposed at predetermined positions relative to a servo reference index. In FIG. 2, one sector 43 comprises SECTOR 0 with a fixed index or mark identifying it as the first data sector. The location of each successive sector 44 is identified by a sector identification signal (SID) 48 read by the transducer heads 28 from the surfaces 20. One or more sectors 44 are preferably reserved as a reserved area 50 for storing data particular to a disk 18 or head 28.

Figure 3:
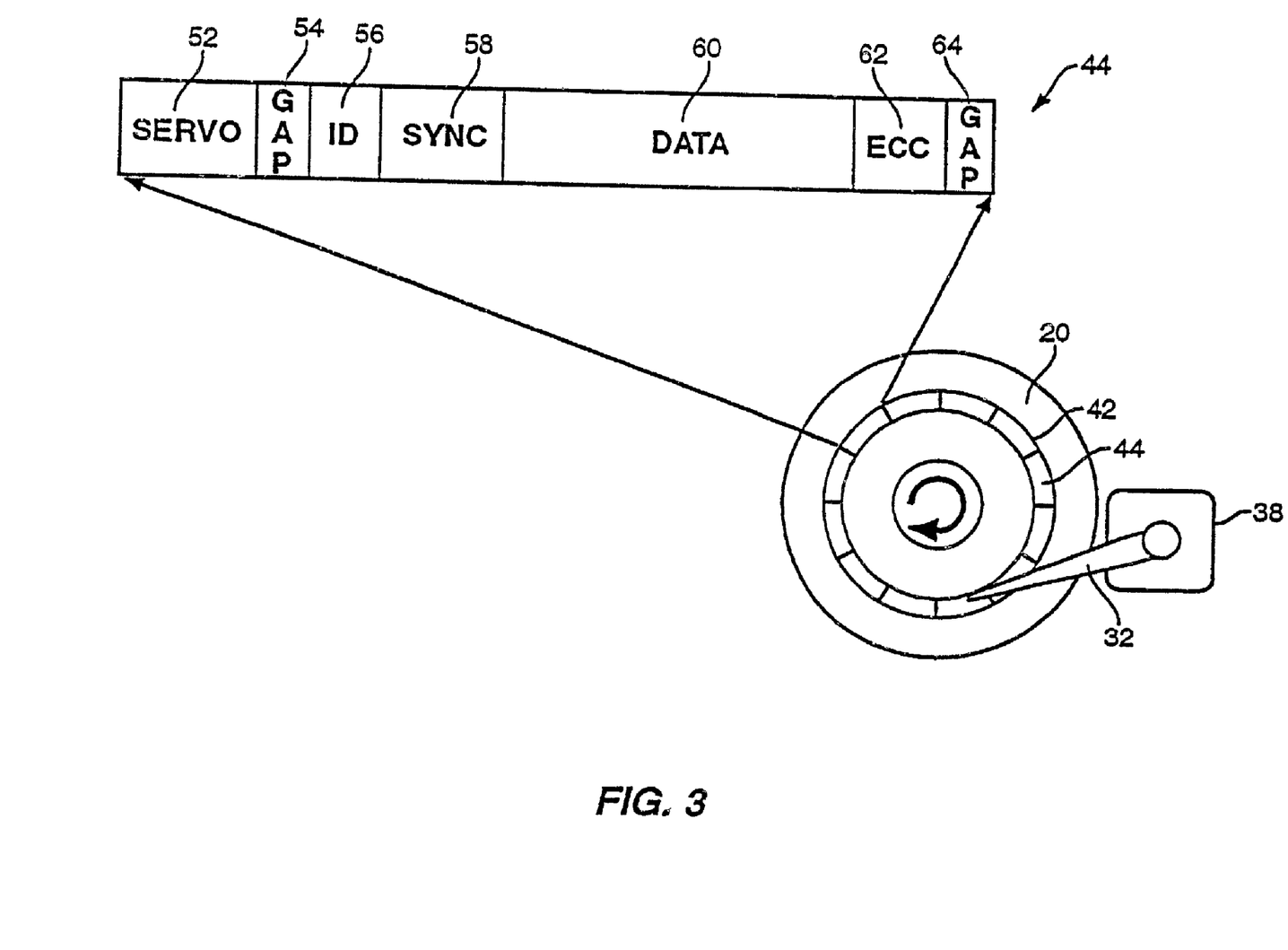
FIG. 3 is a schematic diagram illustrating data and control signals arranged on a disk surface of the DASD of FIG. 1.
Figure 4:
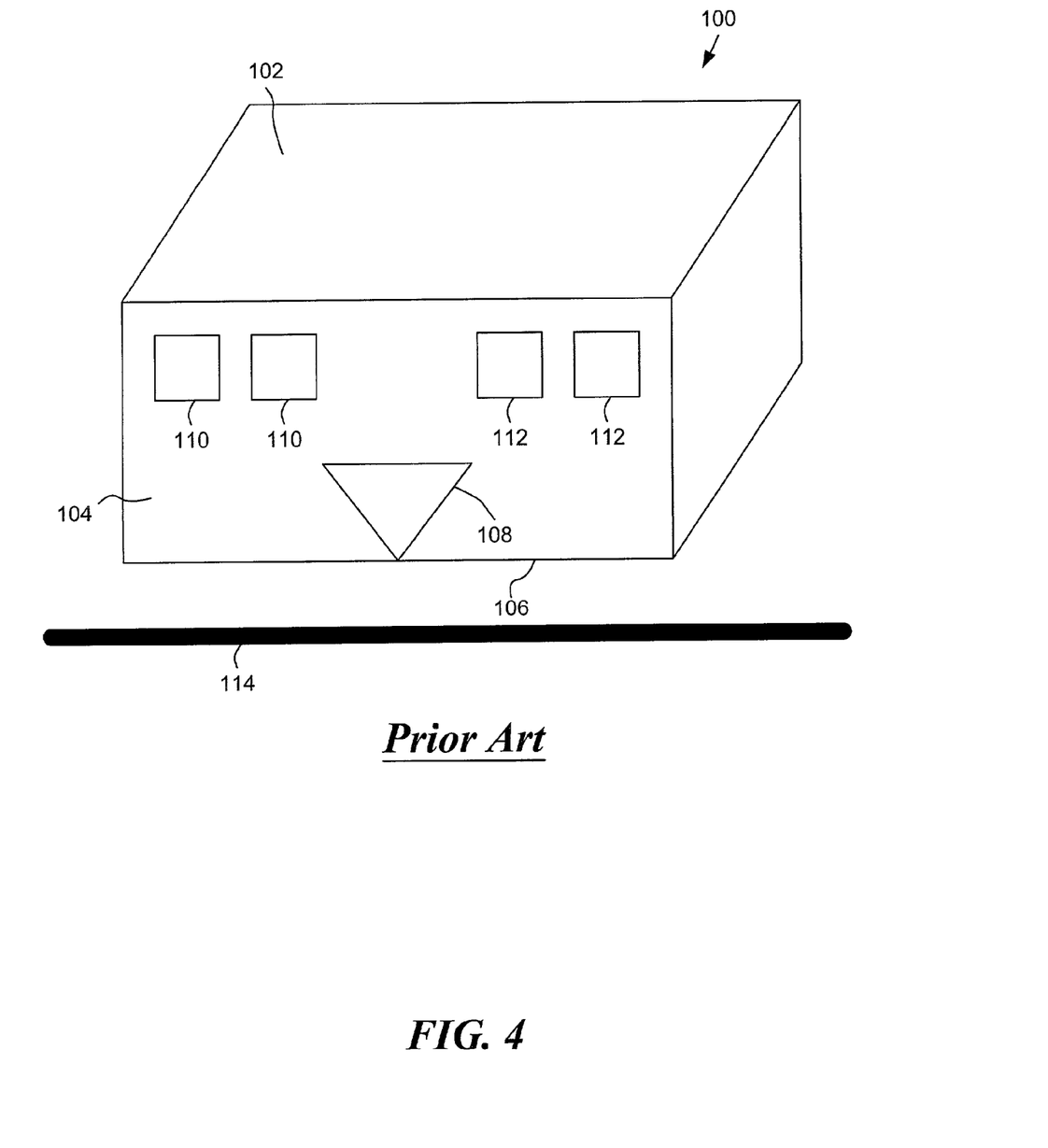
FIG. 4 is a top perspective view illustrating a prior art read/write slider.

FIG. 3 shows one arrangement of a sector 44 of a data track 42. As shown in FIG. 3, the sector 44 includes servo information 52, gaps 54, 64, an index or ID portion 56, sync information 58, a data storage area 60, and error correction codes CCC) 62. The sectors are repeated a fixed number of times within each track 42. In one embodiment, for example, 96 such sectors are formed in each track 42. The servo information, generally known as servo identification marks (SIDs) are read by the transducer heads 28 and used by the control unit to generate a position error signal (PES) indicative of the location of a transducer head 28 with relation to a center point of the track 44. The PES is then used as feedback in driving the servo actuator 38 to position the transducer heads 28. FIG. 4 is a perspective view illustrating a read/write slider 100 of the prior art. The read/write slider 100 is shown positioned over a magnetic disk 114 (shown schematically). The slider 100 has an air bearing surface (ABS) 106, the surface facing the magnetic disk 114 during operation. Opposite the ABS 106 is a top surface 102. A front face 104 of the slider 100 is perpendicular to the ABS and has formed therein a read/write transducer 108. The transducer 108 is configured to read and write data onto the magnetic disk 114. A plurality of sets of electrical contact pads 110 and 112 are set in the face 104 of the slider. The contact pads 110, 112 are configured to connect electrical leads (not shown) containing read and write signals from the control unit 14 to the read/write transducer 108.

Figure 5:
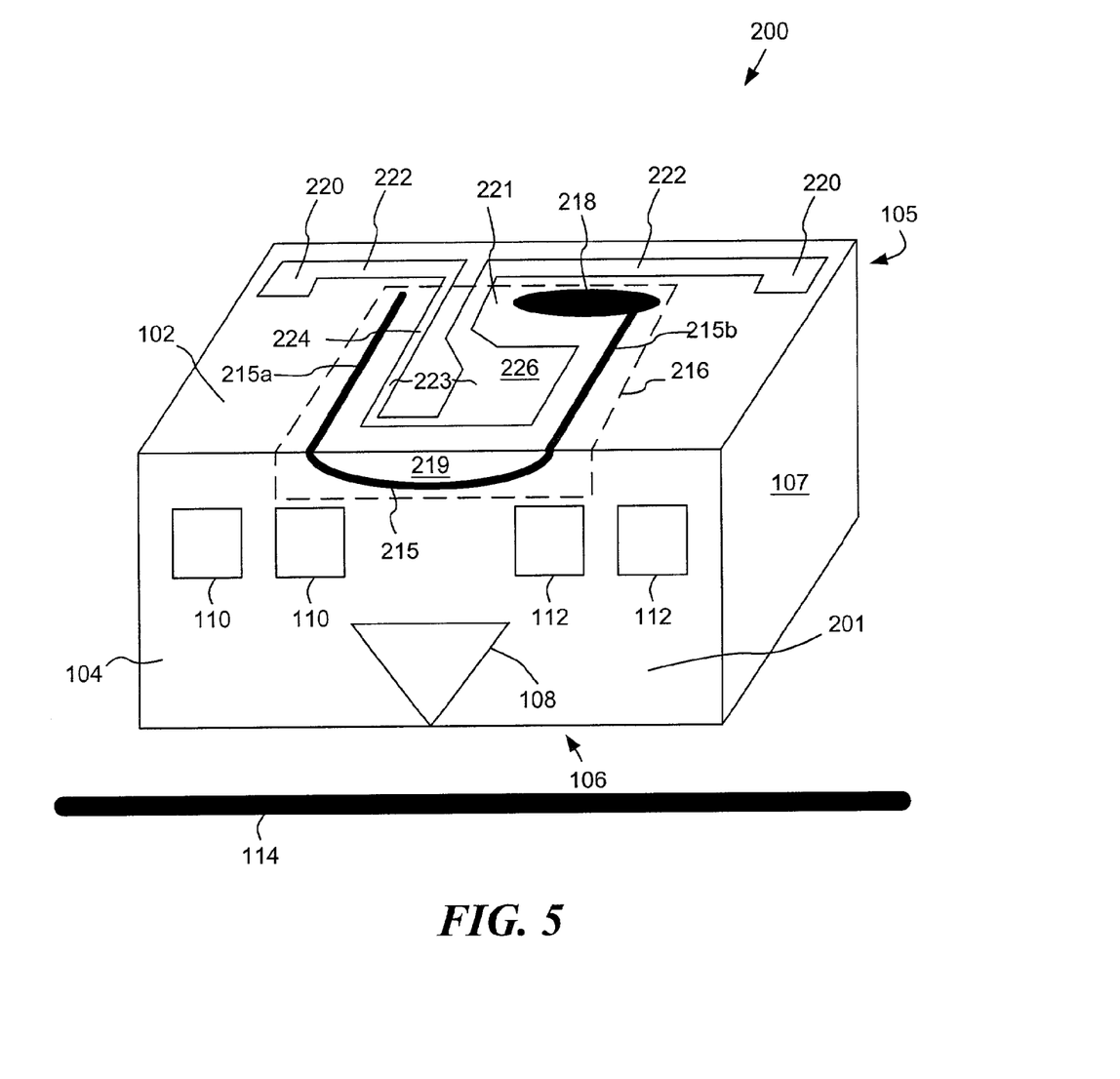
FIG. 5 is a top perspective view illustrating one embodiment of a read/write slider of the present invention.

FIG. 5 is a perspective view illustrating one embodiment of a read/write slider 200 of the present invention. The slider 200 is preferably formed with a body 201 made of a material that may be deep reactive ion etched. In one embodiment, the body 201 of the slider 200 is substantially formed from silicon.

The slider 200 as depicted comprises an etched region 216. Within the etched region 216 is formed a movable member 219. In the depicted embodiment, the movable member 219 is a tongue-like structure attached only at a neck 221 to the body 201 of the slider 200.

The movable member 219 is in one embodiment defined by a curved trench 215 extending between the movable member 219 and the body 201 of the slider 200. Preferably, the trench 215 extends from the face 104 of the slider body 201 through the slider body 201, terminating just prior to reaching a rear face. The trench 215 also preferably extends laterally on a curved plane between the movable member 219 and the slider body 201, beginning on a first side 215*a* and terminating on a second side 215*b*.

A hole 218 preferably extends into the face 102 with a depth at least equal to the depth of the trench 215. The hole 218 preferably intersects the termination point of the trench 215, to one side of the trench 215, leaving the movable member 219 connected to the body 201 only by the narrow neck 221. The neck 221 is preferably somewhat flexible. Accordingly, the movable member 219 is substantially freestanding and capable of being deflected in small increments with respect to the body 201 of the slider 200. In the depicted embodiment, a heater element 223 is located within the etched region 216 atop the movable member 219. The heater element 223 is preferably configured with a narrow lead 224 and a connected wide lead 226 that is substantially parallel and coextensive with the narrow lead 224. Each of the leads 224, 226 terminate in an electrical contact pad 220.

The electrical contact pads 220 are preferably configured to be connected to a set of electrical leads (not shown) connected with the control unit of the DASD to provide current to the heater element 223 and are connected to the heater element 223 by metal leads 222. The heater element 223, metal leads 222, and contact pads 220 are preferably formed of a high melting point conductive material. The high melting point conductive material may be selected from metals such as titanium, tantalum, and tungsten that are easily sputtered onto a silicon surface using known methods. Polysilicon may also be used.

When a current is supplied across the heater element 223, the narrow lead 224, which is narrower than the wide lead 226, experiences greater resistance and increases more rapidly in temperature than the wide lead 226. The uneven heating of the narrow lead 224 and the wide lead 226 causes the movable member 219 to distort, expanding and contracting faster on the narrow lead side as a varying current is passed through the leads 224, 226. This causes the movable member 219 to selectively move back and forth within the trench 215 with respect to the body 201.

The selective movement of the movable member 219 is harnessed by affixing the top of the movable member 219 to the end of the arm 32 of FIG. 2. The slider 200 is thus connected to the arm 32 through the movable member 219. Due to the conservation of momentum, movement with respect to the slider body 201 of the movable member 219, which is affixed to the arm 32, causes the slider body 201 to move with respect to the arm 32.

That is, since the movable member 219 is affixed to the arm 32 of FIG. 2, it cannot move relative to the arm 32 as it distorts. However, the slider body 201, which is affixed to the arm 32 of FIG. 1 only by virtue of its connection to the movable member 219, is able to move. Accordingly, the slider body 200 moves in a direction and with a distance corresponding to the amount of distortion created in the movable member 219. By controlling the amount of current passing through the heater element 223, the amount of distortion and thus movement of the slider body with respect to the movable member 219 can be controlled, allowing an exact placement of the slider body 200. The read/write transducer 108 can thus be exactly positioned with respect to an underlying track on the magnetic disk 114.

Figure 6:
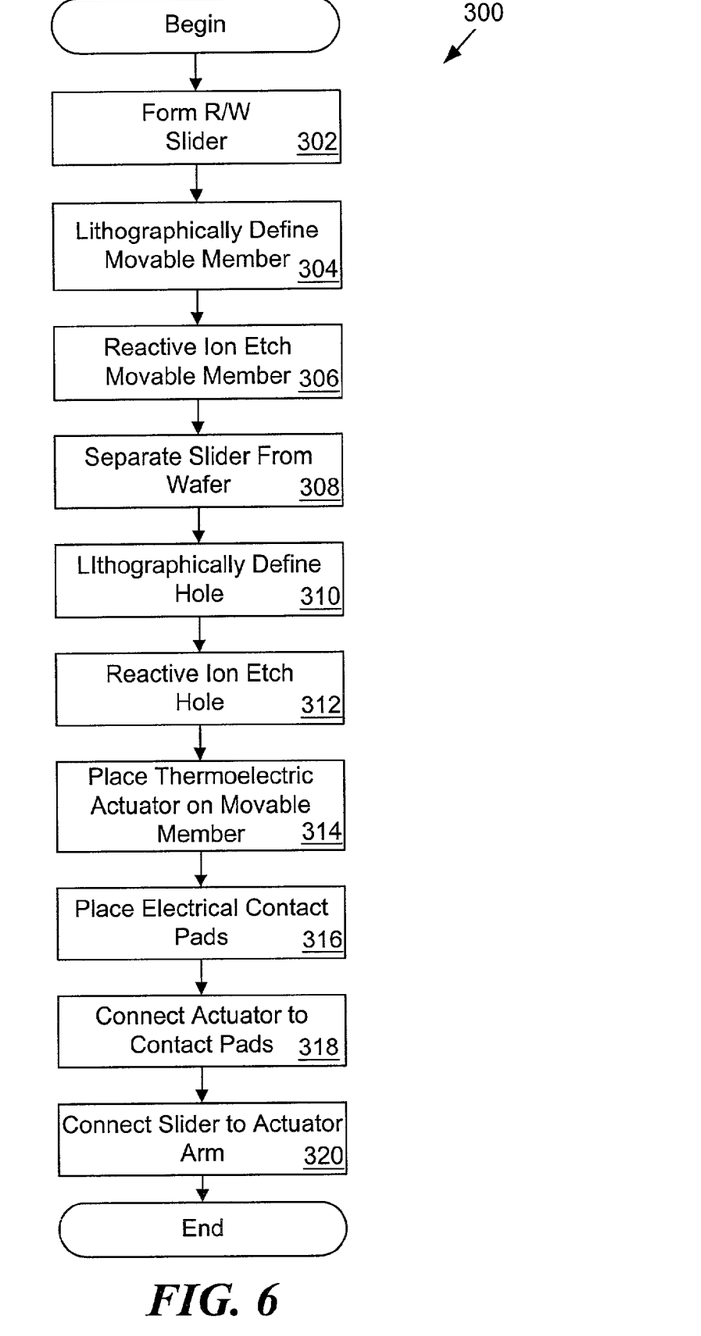
FIG. 6 is a schematic flow chart diagram illustrating one embodiment of a process for the manufacture of an improved read/write slider of the present invention.

FIG. 6 is a schematic flow chart diagram illustrating one embodiment of a process 300 for the manufacture of an improved read/write slider of the present invention. The process 300 will be discussed in one embodiment with reference to the positioning system of FIG. 5. The process 300 begins, and in a step 302, a read/write slider body 350 is formed on a wafer of silicon. Specific manners of formation of the read/write slider body 350 are well known in the art and will not be discussed here in greater detail.

Under the present invention, many slider bodies 350 may be formed on a single silicon wafer during a fabrication process. FIG. 9*a* shows by way of example a plurality of slider bodies 350 formed on a single wafer 404. While only a few slider bodies 350 are shown, in practice, slider bodies 350 are typically so small that thousands may be formed on a single silicon wafer 404.

Figure 7:
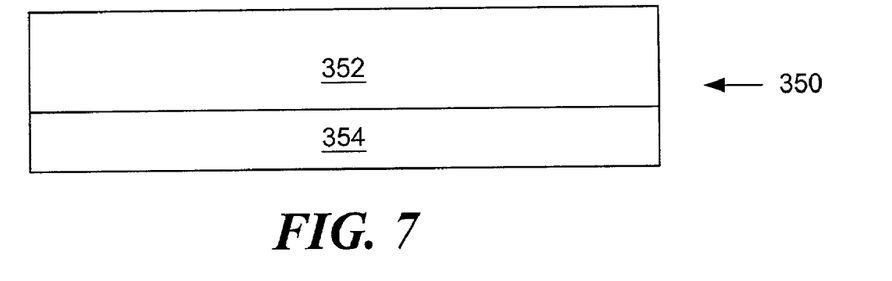
FIG. 7 is a side view illustrating layers formed on a silicon wafer and used in the formation of a body of a read/write slider of the present invention.

FIG. 7 depicts schematically one embodiment of a slider body 350 formed with a silicon substrate 354 having patterned read/write head layers formed therein. The read/write layers are not shown, but are commonly known in the art as the patterned layers used to form a magnetoresistive sensor. Disposed over the read/write layers is a protective layer 352. The protective layer 352 is preferably formed of an electrical insulator such as silicon oxide or silicon nitride. FIG. 7 is a side view of a cross-section of a portion of a silicon wafer such as the wafer 404 of FIG. 9*a*. The portion of the wafer shown in FIG. 7 represents a single slider body 350 which will eventually be separated from the wafer. Consequently, while lateral edges of the slider body 350 are shown, those edges are not generally formed until a slider separation step 308 to be discussed below.

Figure 8:
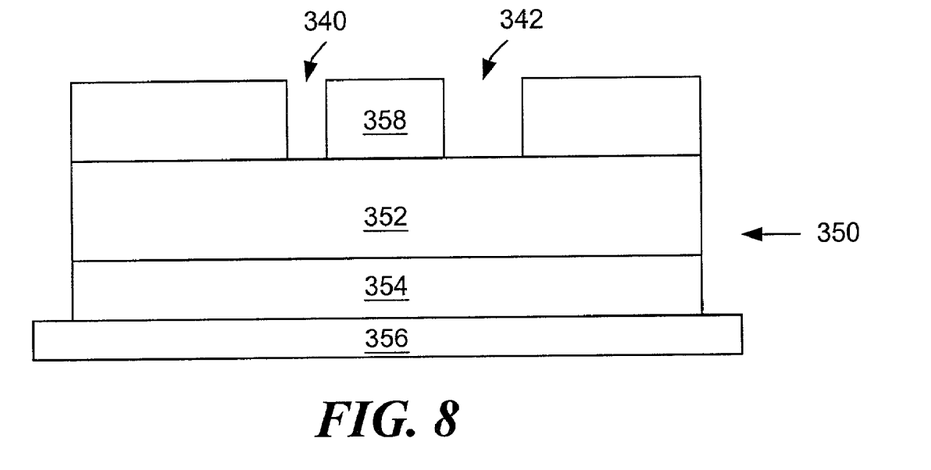
FIG. 8 is a side view illustrating masking of the layers of FIG. 7 used in a process of forming a body of a read/write slider of the present invention.

Once the read/write slider 200 is formed, the etched region 216 is lithographically defined on the body of the slider 200 at a step 304. This step is illustrated in FIG. 8. Shown therein is the slider body 350 held on a wafer holder 356, which also acts as a reactive ion etching (RIE) etch stop. Above the patterned read/write head layer 352 is formed a photoresist mask 358. For illustration purposes, the photoresist mask 358 is shown with two patterned openings, a thin opening 340 and a thick opening 342.

As is well known in the art of semiconductor processing, reactive ion etching has a maximum aspect ratio, and exceeding that aspect ratio results in only a partial etch. Accordingly, thinner openings such as the thin opening 340 are used to etch only partially through the read/write slider body 350, while thicker openings such as the opening 342 are used to etch entirely through the slider body 350 down to the wafer holder 356. The shape and placement of the photoresist defining the etched region 216 can be understood in one embodiment by reference to FIG. 10a. In order to etch the trench 215 into the forward face 104 of the slider body 201, the portion of the trench 215 between points 504 and 508 is left exposed as the thin opening 340, while covering the remainder of the surface 104 with the photoresist mask 358. The aspect ratio of the trench 340 is selected to be sufficiently narrow that the etching process (shown etching downward 410 in FIG. 9a) stops prior to reaching the trailing edge 105 of the slider body 201.

At the same time, the edges of the slider body 201 may be defined by a thicker opening 342 in order to separate the slider body 201 from the wafer. Thus, the thicker opening 342 is patterned around the periphery of the slider body 201, as shown by the heavy lines 406 of FIG. 9a. The reactive ion etching process is then conducted in step 306.

The region lithographically defined in the step 304 is then reactive ion etched into the slider body 200 in a step 306. The etching process is preferably conducted in a direction (indicated at 410 in FIG. 9a) down into the slider body 201 through the surface 104. The edges 406 of the slider body 350 are fully etched, as shown for the trench 346 of FIG. 9, separating the slider body 350 from surrounding slider bodies.

The etching of the trench 344 does not fully penetrate the slider body 350, however. Instead, the etch terminates within the silicon substrate 354, as shown. The partial etch 344 results in a trench such as the trench 215 of FIG. 5. Etching of the trench 215 in turn defines the movable member 219. The movable member 219 is formed in this manner to be freestanding with respect to the rest of the slider body 200, as depicted schematically by the freestanding portion 345 of FIG. 9.

Figure 9:
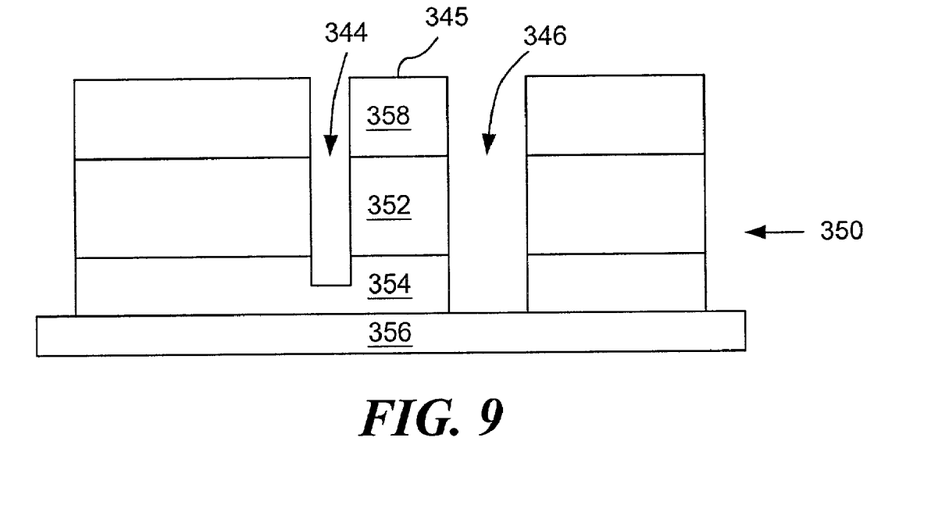
FIG. 9 is a side view illustrating the results of a RIE etching process conducted on the layers of FIG. 8.
Figure 9A:
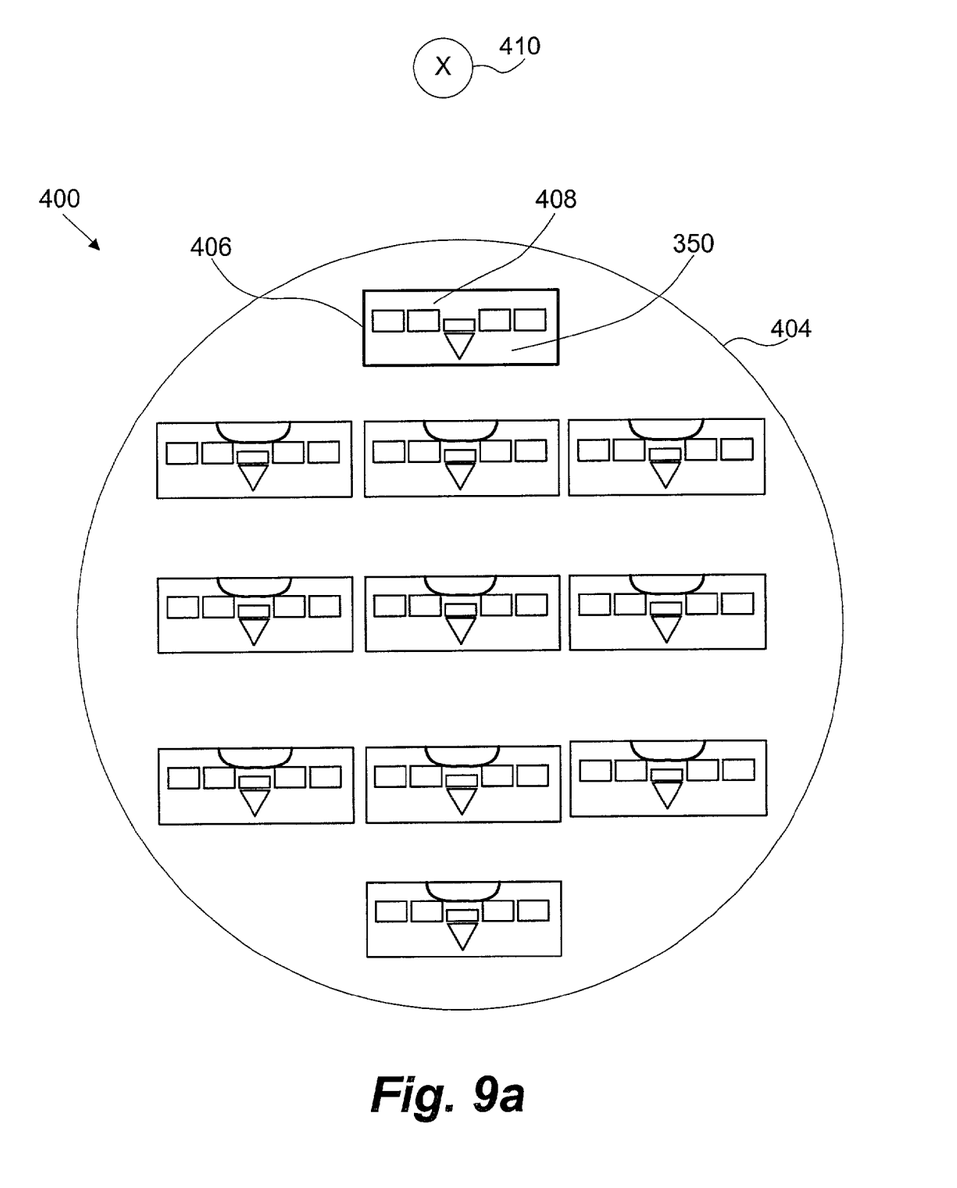
FIG. 9a is a top view illustrating a wafer with a plurality of read/write heads of the present invention formed thereon.
Figure 10:
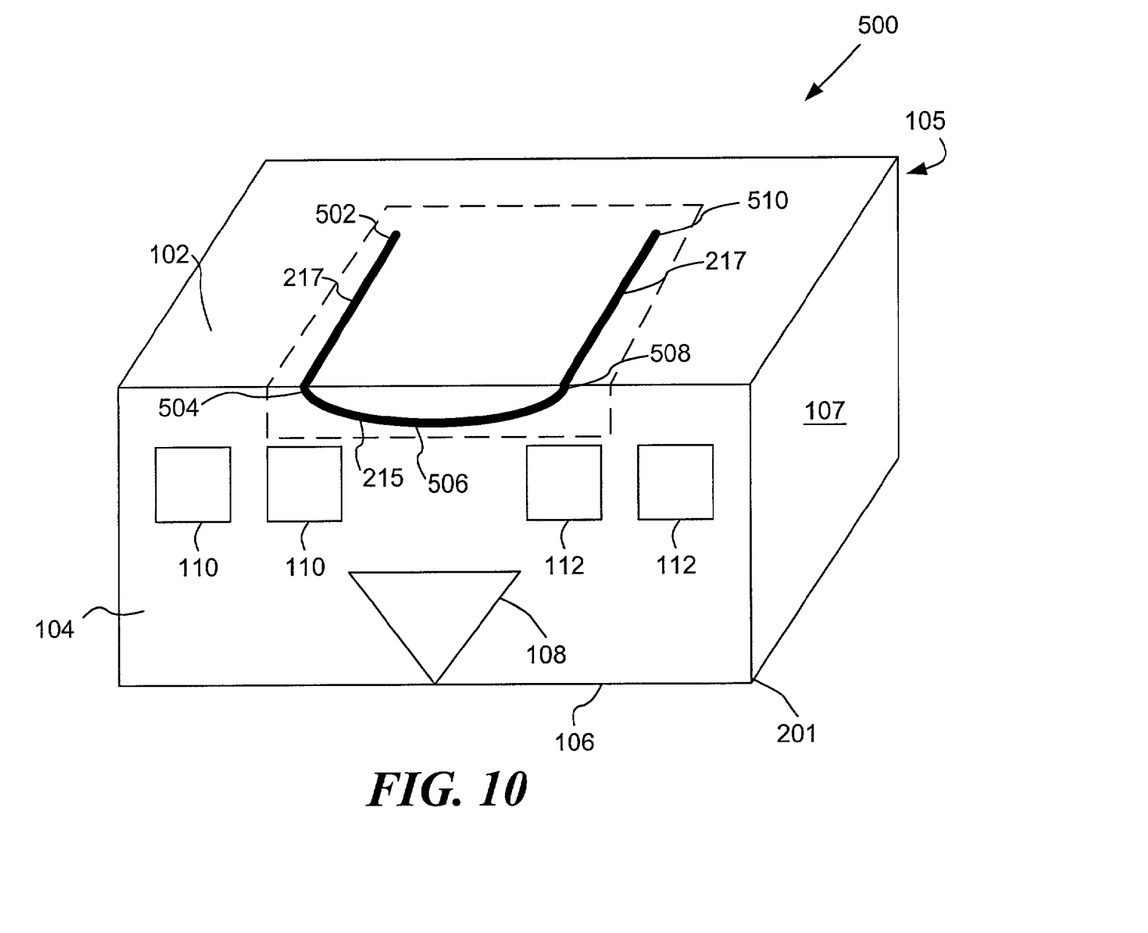
FIG. 10 is a perspective view of a body of a of a read/write slider formed by the RIE etching step 306 of FIG. 6.
Figure 10A:
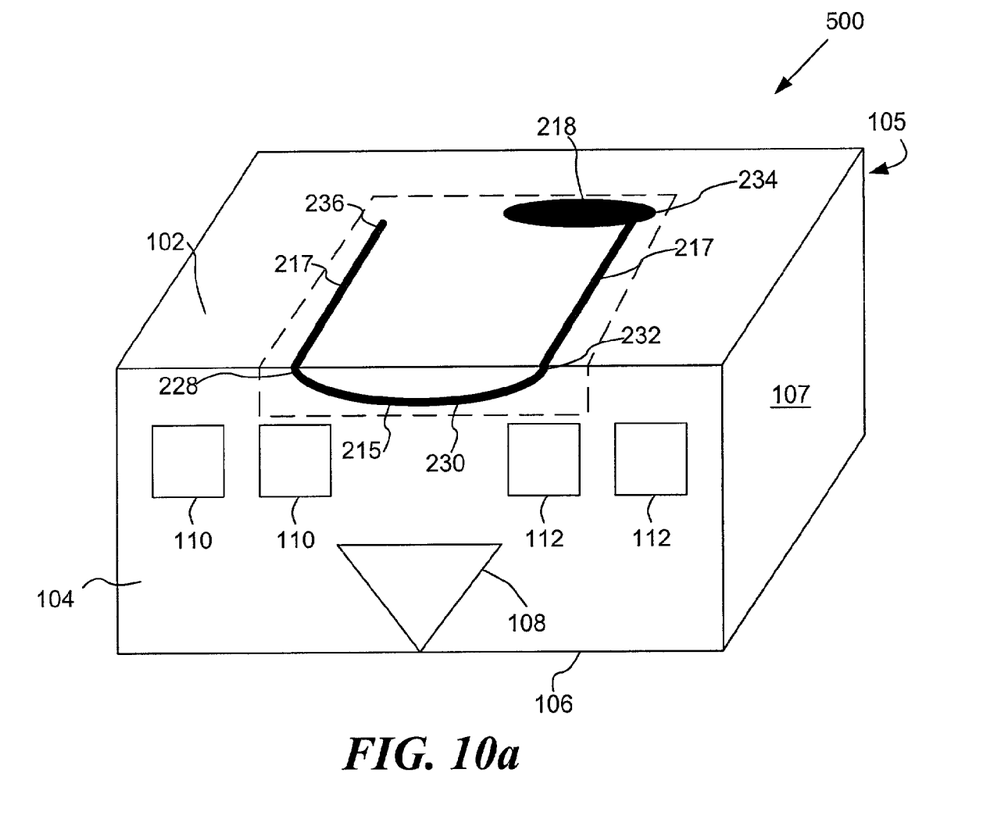
FIG. 10a is a perspective view of a body of a of the read/write slider of FIG. 10 subsequent to the hole etching step 312 of FIG. 6.

Referring to FIG. 10, it should be understood that the locations of the trenches 344, 346 of FIG. 9 are shown by way of example only. If, for example, the trench 346 is considered to be the portion of the periphery 406 defining the top edge 102 of the slider body 201, then it should be seen that the distance between the two trenches 344, 346 will vary. That is, the trench 344 will have a depth corresponding to the distance between the points 502 and 504 and the points 510 and 508, and will be separated from the trench 346 by a distance varying between the points 504 and 508, being the widest at the point 506 and intersecting at the points 504 and 508.

In a further step, 308, the photolithography mask 358 is removed from the wafer, and the slider body 350 is separated from other slider bodies 350 of the wafer on which it was formed. The resultant slider body is shown in FIG. 10. After the slider body 350 has been separated from the silicon wafer, suitable tracking guides may be formed in the air bearing surface 106, after which, in a step 308, the slider 200 is turned over and the hole 218 is lithographically defined in the surface 102 opposite the ABS in a step 310. In a step 312, the hole 218 is then etched into the slider body through the surface 102, perpendicular to the direction of the etch of the trench 215, as discussed above. The creation of the hole 218 in the surface of the slider 200 creates the narrow neck 221, leaving the movable member 219 attached to the body 201 of the slider 200 only at the neck 221. An electro-thermal element 223 is then formed upon the movable member 219 in a step 314. The electro-thermal element 223 is then formed upon the movable member 219. The formation of the electro-thermal element 223 upon the movable member 219 is preferably accomplished by sputtering a high melting point metal on the slider body with the pattern shown in FIG. 5. Such sputtering processes are well known in the art and need not be discussed here in greater detail.

The contact pads 220 are formed on the slider body 201 and are joined to the electro-thermal element 223 by the metal leads 222 in a step 318. The leads 222 and pads 220 may be formed in the same sputtering process as the electro-thermal element 223. The slider 200 is then connected to an arm 32 of a disk drive assembly or other storage device in a step 320. The arm 32 is preferably affixed to the slider body 350 such that the connection point between the arm and the slider body 350 occurs on the movable member 219 as discussed above. In one embodiment, the arm 32 is bonded to the movable member at a point distal to the neck 221.

While the process 300 of FIG. 6 has been described in a given order, it will be readily apparent to one of skill in the art that the order in which the steps of FIG. 6 are conducted may vary. For instance, in one alternative embodiment, steps 314 and 316 are conducted subsequent to step 308 and prior to step 310.

Figure 11:
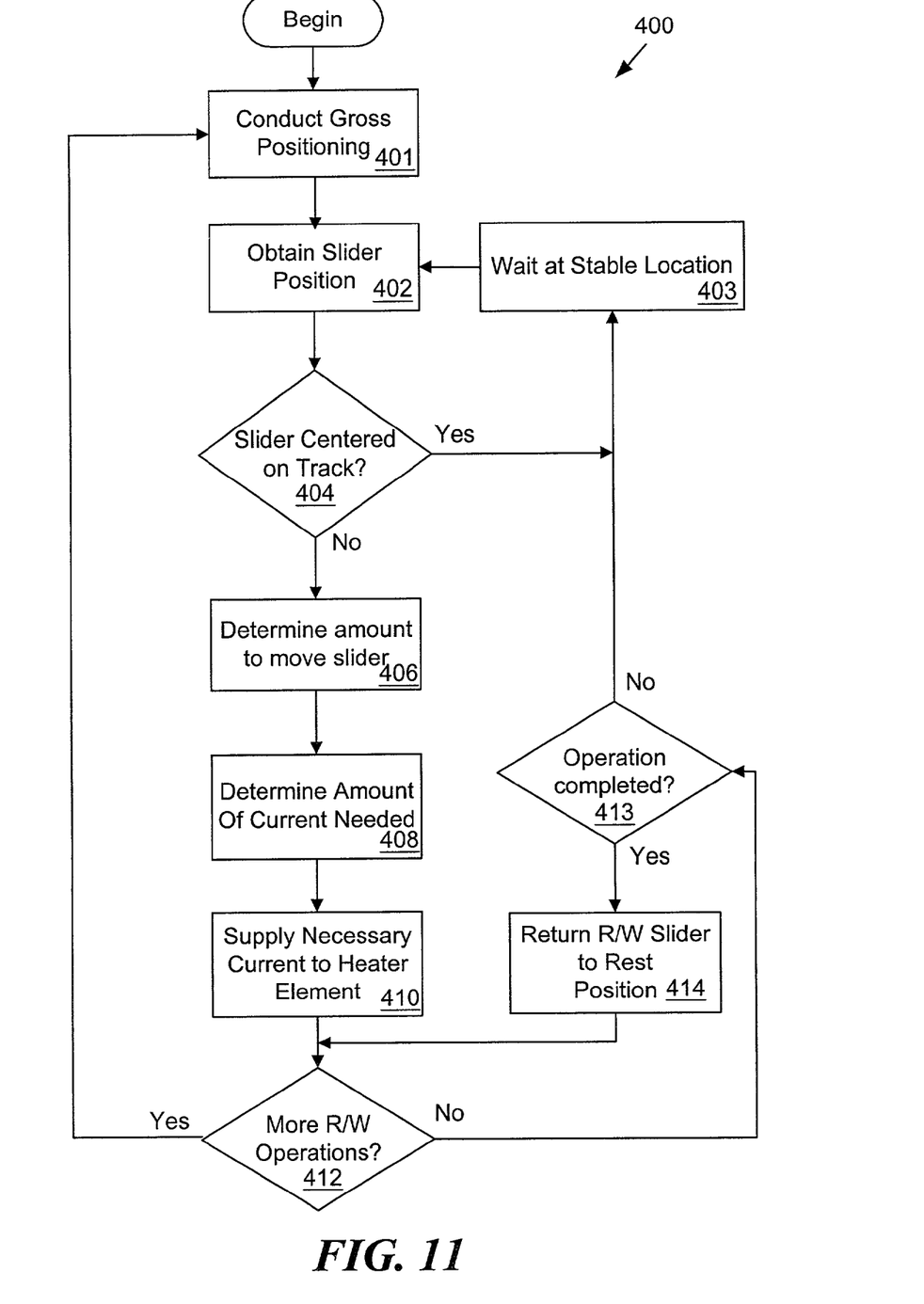
FIG. 11 is a schematic flow chart diagram illustrating one embodiment of a method for exactly positioning a read/write transducer head using the read/write slider of the present invention.

FIG. 11 is a schematic flow chart diagram illustrating one embodiment of a process 400 for using a micromechanical actuator of the present invention. In one embodiment, the micromechanical actuator is configured in the manner discussed above with regard to FIG. 5. In the process 400, at a step 401, the slider 200 is initially positioned over a selected track 44 in a standard manner, typically employing the use the voice coil motor 40, guided by the control unit 14, in response to servo identification marks (SID marks) on the disk and a position error signal (PES). The position of the slider 200 with respect to a centerline of the selected track 44 is then obtained, preferably, with a PES. In a step 404, the position data obtained from the voice coil motor 40 is evaluated to determine if the slider 200 is positioned over the centerline of the track. If the slider 200 is positioned over the centerline of the track, or within a sufficient distance from it, the process 400 enters a stable state in a step 403. The method remains in the stable state until the slider has moved again, at which point the new position of the slider is obtained and the process 400 starts over.

If however, the slider 200 is not centered on the track, exceeding a selected threshold PES, for example, the process 400 then proceeds to a step 406. The micropositioning process of the present invention may thus be incurred when the PES is erratic due to nonrepeatable runout, vibration, or the like. Step 404 may also be omitted in certain embodiments, such that micropositioning is not selective, but is used after each instance of seeking a new track 44.

At the step 406, the distance the slider 200 needs to move to be centered on the track in a step 406 is determined. Thereafter, the amount of current that is needed to move the slider 200 the necessary distance is determined in a step 408. Preferably, the control unit 14 of FIG. 1 performs the steps of determining the position of the slider and the amount of current needed to position the slider accurately using feed back from the servo marks 52 on the disk surface. The current may be calculated from equations or may be acquired from a look-up table.

The current supplied to the heater element 223 is then adjusted in a step 410. The voice coil motor driving circuitry is used in one embodiment to provide the current to the heater element 223. The current supplied to the heater element in the step 410 heats the narrow segment 224 faster than the wide segment 226, causing a distortion in the movable member 219. Since the movable member 219 is affixed to the arm 32 of FIG. 2, it does not substantially move relative to the arm 32 as it distorts. However, as discussed, the rest of the slider body 200, which is not affixed to the arm 32 of FIG. 1, is free to move. The slider body 200 thus moves a direction and distance corresponding and opposite to the amount of movement created by the distortion of the movable member 219. This process of moving the slider body 200 in relation to the distortion of the movable member 219 allows an exact placement of the slider body 200. In one embodiment, a bias current is continually supplied to the heater element 223, holding the slider body 201 in an intermediate position. Reducing the amount of current swings the slider body 201 in one direction with respect to the arm 32, and increasing the amount of current supplied swings the slider body 201 in the opposite direction.

The process of steps 402 through 410 may be repeated during tracking on a single track 44, repeatedly generating a new PES and making adjustments using the steps 404 through 410 as necessary. This manner of tracking continues until a new read or write operation is requested to be performed as indicated in a step 412. This is indicated by steps 413 and 414, which check for the end of the operation and if it has ended, return the slider to a rest position, and if the operation has not ended, progressing to a step 403 to wait for a new PES signal.

When a new read or write operation is requested, the process 400 returns to the step 401 and begins again at the new slider position. However, if another read or write operation is not waiting to be performed, the slider 200 is returned to a rest position in a step 414 and the process 400 returns to the step 403 where it waits for a new position error signal or a new read or write operation to be initiated.

What is claimed is:

1. A micromechanical actuator for a storage device, comprising:
    a read/write slider;
    a movable member formed as an integral part of the read/write slider; and
    an electro-thermal actuator element in contact with the movable member, to effect relative positioning of the read/write slider,
    wherein the movable member further comprises a proximal end and a distal end, the proximal end is integrally attached to the slider body and the distal end freely stands with respect to the slider body,
    and, wherein the movable member further comprises an integral, elongated portion of the slider body defined at the distal end by a leading edge of the slider body, defined at a top end by the top of the slide body, defined at a bottom by a trench having the shape of a curved plane extending laterally through the slider body and extending from a first side member to a second side, the movable member attached at the proximal end to the slider body.

2. The micromechanical actuator of claim 1, further comprising a hole disposed substantially at the proximal end of the movable member, the hole defines a narrow neck in the rear of the movable member.

3. A micromechanical actuator for a storage device, comprising:
    a read/write slider;
    a movable member formed as an integral part of the read/write slider; and
    an electro-thermal actuator element in contact with the movable member, to effect relative positioning of the read/write slider,
    wherein the movable member further comprises a proximal end and a distal end, the proximal end is integrally attached to the slider body and the distal end freely stands with respect to the slider body and
    wherein the movable member further comprises a lithographically defined tongue-shaped region etched out of a face of a body of the read/write slider.

4. The micromechanical actuator of claim 3, wherein the movable member further comprises an integral, elongated portion of the slider body defined at the distal end by a leading edge of the slider body, defined at a top end by the top of the slide body, defined at a bottom by a trench having the shape of a curved plane extending laterally through the slider body and extending from a first side member to a second side, the movable member attached at the proximal end to the slider body.

5. The micromechanical actuator of claim 4, further comprising a hole disposed substantially at the proximal end of the movable member, the hole defines a narrow neck in the rear of the movable member.

6. The micromechanical actuator of claim 3, wherein the electro-thermal actuator element further comprises an electro-thermal heater element placed substantially on the movable member.

7. The micromechanical actuator of claim 6, wherein the electro-thermal heater element comprises first and second leads extending in two substantially parallel directions on the movable member, the first lead extending along a first side of the movable member and the second lead extending along a second side of the movable member.

8. A micromechanical actuator for a storage device, comprising:
    a read/write slider;
    a movable member formed as an integral part of the read/write slider; and
    an electro-thermal actuator element in contact with the movable member, to effect relative positioning of the read/write slider,
    wherein the electro-thermal actuator element further comprises an electro-thermal heater element placed substantially on the movable member, and
    wherein the electro-thermal heater element comprises first and second leads extending in two substantially parallel directions on the movable member, the first lead extending along a first side of the movable member and the second lead extending along a second side of the movable member.

* * * * *

UNITED STATES PATENT AND TRADEMARK OFFICE
CERTIFICATE OF CORRECTION

PATENT NO.        : 7,230,799 B2
APPLICATION NO.   : 09/933218
DATED             : June 12, 2007
INVENTOR(S)       : Jeffrey S. Lille It is certified that error appears in the above-identified patent and that said Letters Patent is hereby corrected as shown below:

Title page item [73]
(A)Name of Assignee: "Hitachi Global Storage Technologies" should read-- Hitachi Global Storage Technologies Netherlands B.V. --.

(B)Residence (City and State OR Country): "Amsterdam Netherlands B.V." should read--Amsterdam, The Netherlands--.

Column 1, paragraph 3, line 26-42
"Current hard disk drives also typically utilize an actuator connected to the slider by a support arm assembly. The actuator moves the slider to the desired track and maintains it over the track centerline during read or write operations. The movement of the slider to a desired track is referred to as data seeking or merely "seeking," Maintaining the slider over the centerline of the desired track during read or write operation is referred to as track following or "tracking."
Current hard disk drives also typically utilize an actuator connected to the slider by a support arm assembly. The actuator moves the slider to the desired track and maintains it over the track centerline during read or write operations. The movement of the slider to a desired track is referred to as data seeking or merely "seeking." Maintaining the slider over the centerline of the desired track during read or write operation is referred to as track following or "tracking." "

The paragraphs are duplicated and one should be omitted to read-- Current hard disk drives also typically utilize an actuator connected to the slider by a support arm assembly. The actuator moves the slider to the desired track and maintains it over the track centerline during read or write operations.

UNITED STATES PATENT AND TRADEMARK OFFICE
CERTIFICATE OF CORRECTION

PATENT NO. : 7,230,799 B2
APPLICATION NO. : 09/933218
DATED : June 12, 2007
INVENTOR(S) : Jeffrey S. Lille It is certified that error appears in the above-identified patent and that said Letters Patent is hereby corrected as shown below:

<u>Column 1, paragraph 3, line 26-42 (cont'd)</u>
The movement of the slider to a desired track is referred to as data seeking or merely "seeking." Maintaining the slider over the centerline of the desired track during read or write operation is referred to as track following or "tracking."--

Signed and Sealed this

Eleventh Day of September, 2007

JON W. DUDAS
*Director of the United States Patent and Trademark Office*